(12) United States Patent
Josipovic et al.

(10) Patent No.: US 11,176,288 B2
(45) Date of Patent: Nov. 16, 2021

(54) SEPARATION PLANE COMPRESSION

(71) Applicant: Microsoft Technology Licensing, LLC, Redmond, WA (US)

(72) Inventors: Pavle Josipovic, Belgrade (RS); Eoin McLoughlin, Dublin (IE); Maxwell Simon Abernethy, San Francisco, CA (US); Milan Simic, Belgrade (RS); Nathanael Presson, Hoehyeon-ri (KR); Nikola Nikolic, Belgrade (RS); Oliver M. Strunk, Munich (DE); Petar Mitrovic, Belgrade (RS); Rory Mullane, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 847 days.

(21) Appl. No.: 15/870,585

(22) Filed: Jan. 12, 2018

(65) Prior Publication Data

US 2019/0065641 A1 Feb. 28, 2019

Related U.S. Application Data

(60) Provisional application No. 62/550,455, filed on Aug. 25, 2017.

(51) Int. Cl.
*H03M 7/30* (2006.01)
*A63F 13/577* (2014.01)
(Continued)

(52) U.S. Cl.
CPC .......... *G06F 30/20* (2020.01); *H03M 7/3059* (2013.01); *A63F 13/577* (2014.09); *G06F 2111/10* (2020.01)

(58) Field of Classification Search
CPC .. G06F 30/20; G06F 2111/10; H03M 7/3059; A63F 13/577
(Continued)

(56) References Cited

U.S. PATENT DOCUMENTS 6,054,991 A 4/2000 Crane et al.
6,603,470 B1 * 8/2003 Deering ................. G06T 9/001
345/419

(Continued)

FOREIGN PATENT DOCUMENTS

WO 2017092252 A1 6/2017

OTHER PUBLICATIONS

"Hyperplane separation theorem", Retrieved From https://en.wikipedia.org/wiki/Hyperplane_separation_theorem, Retrieved on: Sep. 12, 2017, 4 Pages.

(Continued)

*Primary Examiner* — Kamini S Shah
*Assistant Examiner* — Faraj Ayoub
(74) *Attorney, Agent, or Firm* — Alleman Hall Creasman & Tuttle LLP (57) ABSTRACT

A computing device, including a processor configured to execute a physics engine. At a first time step, the physics engine may, for a first body located at a first position, determine a non-collision region bounded on a side by a separation plane such that when the first body is within the non-collision region, the first body does not collide with a second body. The physics engine may apply lossy compression to the separation plane to generate a compressed separation plane, and may determine a first conservative distance vector between the first body and the compressed separation plane. At a second time step, the physics engine may move the first body to a second position, determine a second conservative distance vector between the first body
(Continued)

and the compressed separation plane, and translate the compressed separation plane based on the second position and the second conservative distance vector.

18 Claims, 7 Drawing Sheets

(51) Int. Cl.
 *G06F 111/10* (2020.01)
 *G06F 30/20* (2020.01)
(58) Field of Classification Search
 USPC .......................................................... 703/2
 See application file for complete search history.

(56) References Cited

U.S. PATENT DOCUMENTS

| | | | |
|---|---|---|---|
| 8,154,545 | B2 | 4/2012 | Gobel et al. |
| 8,437,992 | B2 | 5/2013 | Bond et al. |
| 9,440,148 | B2 * | 9/2016 | Bond ........................ A63F 13/10 |
| 9,463,385 | B2 | 10/2016 | Ishikawa et al. |
| 9,495,485 | B2 | 11/2016 | Matsuike et al. |
| 2002/0196848 | A1 * | 12/2002 | Roman ................... H04N 19/17 375/240.08 |
| 2004/0217956 | A1 * | 11/2004 | Besl ....................... G06T 15/205 345/419 |
| 2011/0199302 | A1 | 8/2011 | Tossell et al. |

OTHER PUBLICATIONS

Souto, Nilson, "Video Game Physics Tutorial—Part II: Collision Detection for Solid Objects", Retrieved From https://www.toptal.com/game/video-game-physics-part-ii-collision-detection-for-solid-objects, Retrieved on: Sep. 12, 2017, 28 Pages.

Chung, et al., "Quick Collision Detection of Polytopes in Virtual Environments", In Proceedings of the ACM Symposium on Virtual Reality Software and Technology, Jul. 1996, 8 Pages.

Chung, et al., "Quick Elimination of Non-Interference Polytopes in Virtual Environments", In Journal of ACM Symposium on Virtual Reality Software and Technology, Feb. 1996, 10 Pages.

Heckbert, Paul S., "Graphics Gems IV", In Publication of Morgan Kaufmann, Jun. 17, 1994, 579 Pages.

* cited by examiner

SEPARATION PLANE COMPRESSION

CROSS REFERENCE TO RELATED APPLICATIONS

This application claims priority to U.S. Provisional Patent Application Ser. No. 62/550,455, filed Aug. 25, 2017, the entirety of which is hereby incorporated herein by reference for all purposes.

BACKGROUND

Physics engines are frequently used to make computer simulations of physical systems, for example, in video games. Simulating a physical system using a physics engine frequently involves simulating collisions between pairs of objects, which may include determining whether those objects are colliding. However, when the physical system includes a large number of objects, checking whether objects are colliding with each other may consume large amounts of computing resources, including memory and/or processing.

SUMMARY

According to one aspect of the present disclosure, a computing device is provided comprising a processor configured to execute a physics engine to simulate real-time dynamics of a simulated physical system including a plurality of bodies. At a first time step, the physics engine may be configured to, for a first body of the plurality of bodies located at a first position, determine a non-collision region such that when the first body is within the non-collision region, the first body does not collide with a second body of the plurality of bodies. The non-collision region may be bounded on a side by a separation plane that partitions the simulated physical system. The physics engine may be further configured to apply lossy compression to the separation plane to generate a compressed separation plane. The physics engine may be further configured to determine a first conservative distance vector between the first body and the compressed separation plane. At a second time step, the physics engine may be configured to move the first body from the first position to a second position that has a displacement from the first position. The physics engine may be further configured to determine a second conservative distance vector between the first body and the compressed separation plane. The physics engine may be further configured to translate the compressed separation plane based on the second position and the second conservative distance vector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
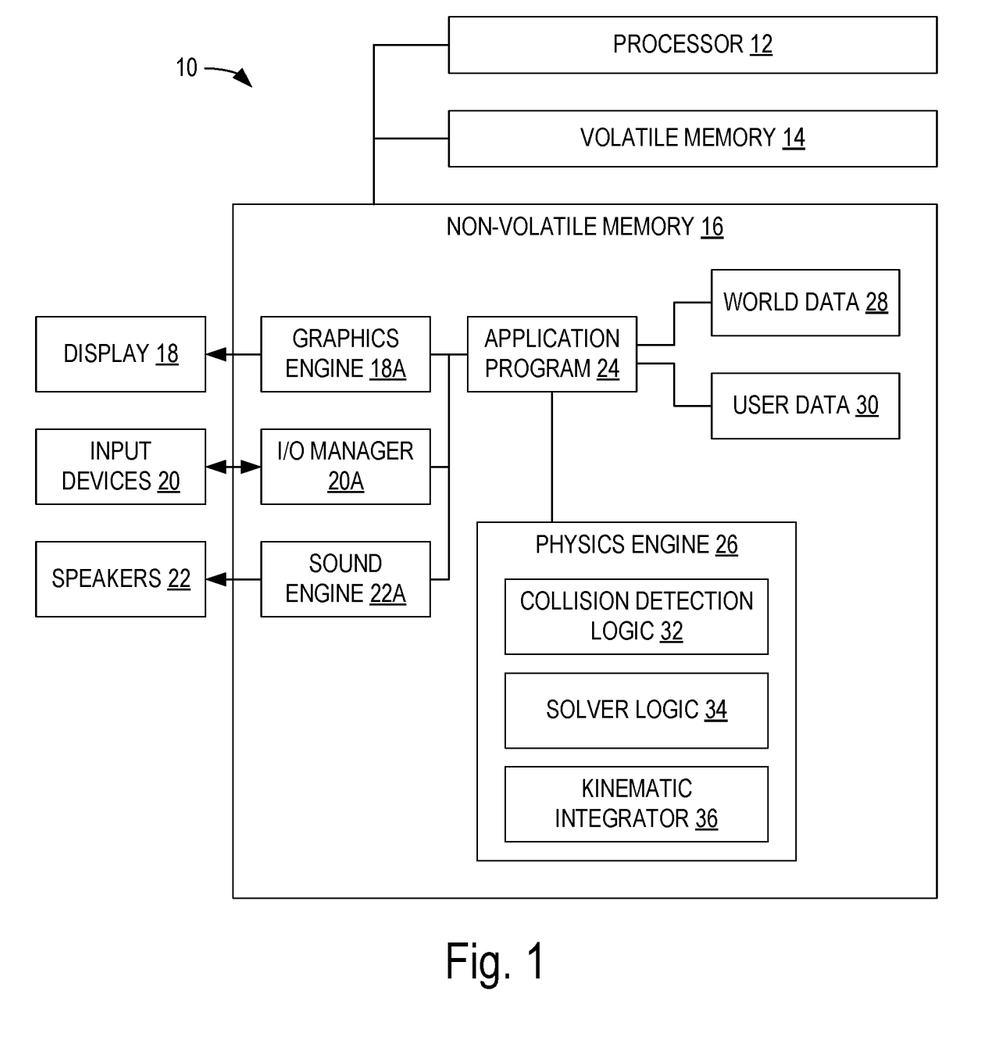
FIG. 1 shows a computing device including a processor configured to execute a physics engine to simulate the real-time dynamics of a simulated physical system including a plurality of bodies, according to one embodiment of the present disclosure.

FIG. 1 illustrates a computing device 10 configured with a physics engine 26 having collision detection features, according to one embodiment of the present disclosure. Computing device 10 includes a processor 12, volatile memory 14 such as RAM, non-volatile memory 16 such as a hard disk or FLASH memory, a display 18, input devices 20 such as a mouse, keyboard, touchscreen, etc., and one or more speakers 22. The processor 12 is configured to execute various software programs, such as application program 24, which are stored in non-volatile memory 16, using portions of volatile memory 14. Drivers such as a graphics engine 18A, an I/O manager 20A, and sound engine 22A enable communication between application program 24 and the display 18, input devices 20 and speakers 22, respectively. Application program 24 may be a computer game, or virtually any other type of program that utilizes a physics engine 26 that simulates real-time dynamics in response to user inputs and program logic.

Application program 24 is configured to utilize, and processor 12 is configured to execute, a physics engine 26 to simulate the real-time dynamics of a simulated physical system including a plurality of bodies. Typically, the bodies of the plurality of bodies are rigid bodies. Data representing these physical bodies is stored as world data 28 and user data 30. At a high level, the physics engine 26 includes collision detection logic 32, solver logic 34, and a kinematic integrator 36, which are applied iteratively by the physics engine 26 to adjust the positions and velocities of various bodies in the physical system in order to make them behave appropriately under applied forces, such as gravity, wind resistance, springs, magnetism, etc., as well as observe physical constraints, such as non-penetration of other rigid bodies, joint constraints, etc. Collision detection logic 32, solver logic 34, and kinematic integrator 36 are typically software programs executed by the processor 12, which may be a multi-threaded and possibly multi-core central processing unit (CPU). However, in some embodiments portions or all of the logic of the physics engine 26 described herein may be implemented in firmware or hardware, for example on a graphical processing unit (GPU).

Figure 2:
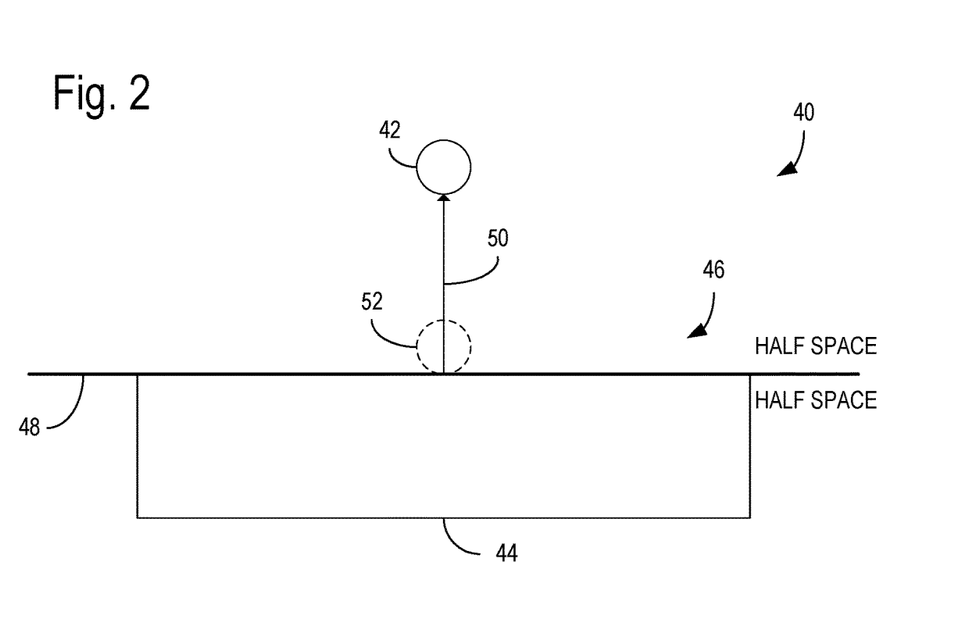
FIG. 2 shows a simulated physical system, including a separation plane, at a first time step, as simulated by the physics engine of FIG. 1.

The physics engine 26 may simulate the real-time dynamics of the simulated physical system in a plurality of discrete time steps. A simulated physical system 40 is shown at a first time step in FIG. 2. In FIG. 2, a first body 42 of the plurality of bodies is depicted at a first position, and a second body 44 of the plurality of bodies is depicted at a second position. The simulated physical system 40 is shown in two dimensions for ease of illustration. Although only two bodies are depicted in the simulated physical system 40 of FIG. 2, the simulated physical system would include more than two bodies in most implementations. When the simulated physical system 40 includes more than two bodies, collision detection may be performed for each possible pair of bodies, or alternatively for only some of the possible pairs of bodies. In addition, the simulated physical system 40 may be a region of interest defined by a collision detection boundary, wherein the physics engine 26 is configured to detect collisions between bodies within the region of interest.

The physics engine 26 is configured to determine a non-collision region 46 for the first body 42 and the second body 44 such that when the first body 42 is within the non-collision region 46, the first body 42 does not collide with the second body 44. Using a non-collision region to determine that the first body 42 does not collide with the second body 44 may save computational resources, since the physics engine 26 does not need to invoke more computationally resource-intensive collision detection algorithms if it determines that the first body 42 is in the non-collision region.

The non-collision region 46 depicted in FIG. 2 is bounded on a side by a separation plane 48 that partitions the simulated physical system 40. The separation plane 48 divides the bounded region of interest in which the collision is being detected into two half spaces, wherein the half space in which the first body 42 is located is the non-collision region 46. In order to prevent the separation plane 48 from passing through the first body 42 or the second body 44, the first body 42 and the second body 44 may be convex. To ensure that the first body 42 and the second body 44 are convex, an entry condition to the techniques described herein may be to determine that the first body 42 and second body 44 within the region of interest defined by the collision detection boundary are both convex. The physics engine 26 may be configured to divide a concave body into a plurality of convex bodies, so that the techniques herein may be applied.

The physics engine 26 may determine the separation plane 48 based at least in part on a normal vector 50 of the separation plane 48. The tip of the normal vector 50 may be located at the position of the first body 42, and the tail of the normal vector 50 may be located at a reference position 52 at which the first body 42 would collide with the second body 44. In some embodiments, the separation plane 48 may be represented in the non-volatile memory 16 of the computing device 10 by four coordinates, which may include a normal vector 50 with a direction specified by three components and a displacement from a reference point specified by one coordinate. The components of the normal vector 50 may be Cartesian, spherical, or cylindrical coordinates. In some embodiments, the displacement from the reference point may be a coordinate of the reference position 52 at which the first body 42 would collide with the second body 44, as shown in FIG. 2. Other values of the displacement from the reference point, such as a coordinate of a point some threshold distance away from the position at which the first body 42 and the second body 44 would collide, are also contemplated. The physics engine 26 may determine whether the first body 42 is within the non-collision region 46 by checking that $$(v_{b1} - v_r) \cdot v_n > 0,$$

where $v_{b1}$ is the position of the first body 42, $v_r$ is the reference position 52, and $v_n$ is the normal vector 50. The physics engine 26 may detect that the first body 42 is within the non-collision region 46 as long as the above inequality is true.

Although only two bodies are shown in FIG. 2, the simulated physical system 40 may include more than two bodies in some implementations. In such implementations, the physics engine 26 may determine a non-collision region 46 and a separation plane 48 for each of any number of pairs of bodies in the simulated physical system 40. However, when the physics engine 26 simulates a large number of separation planes, the physics engine 26 may use a large portion of the volatile memory 14 and/or non-volatile memory 16 of the computing device 10.

Figure 3A:
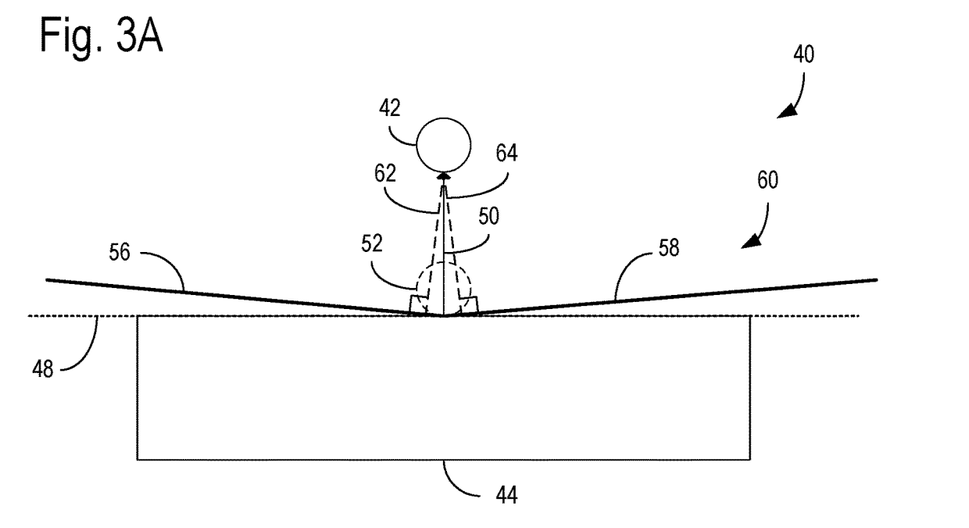
FIG. 3A shows the simulated physical system of FIG. 2, including a compressed separation plane, at a first time step.

In order to reduce the amount of memory used by the physics engine 26, the physics engine 26 may be configured to apply lossy compression to the non-collision region 46 to generate a compressed separation plane, as depicted in FIG. 3A. The compressed separation plane may bound a compressed non-collision region 60 on a side. In some embodiments, the coordinates of the separation plane 48 may be expressed as floating-point numbers. In such embodiments, lossy compression may be applied to the separation plane 48 at least in part by rounding or truncating at least one floating-point number, which may be at least one component of the direction of the normal vector 50 and/or the displacement of the normal vector 50 from the reference point. Typically, all of the components of the direction of the normal vector 50 and the displacement from the reference point are compressed via lossy compression in this manner. In such embodiments, lossy compression may be applied to the separation plane 48 at least in part by compressing at least one coordinate of the separation plane 48 from four bytes to one byte. Typically, all coordinates defining the separation plane 48 are compressed in this manner from four bytes to one byte. Alternatively, lossy compression of another compression ratio may be applied.

Figure 3B:
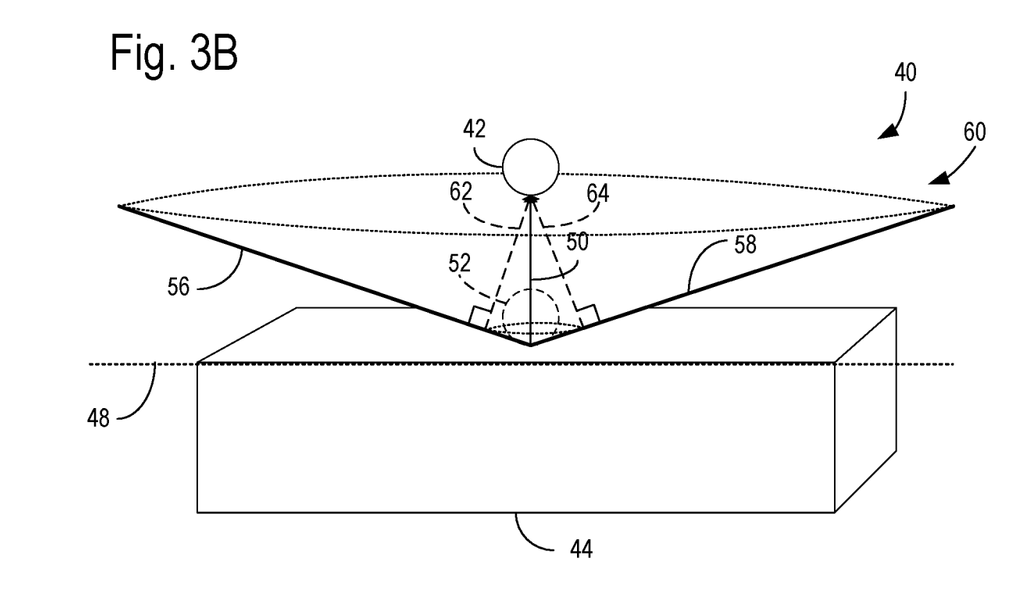
FIG. 3B shows a three dimensional view of the simulated physical system of FIG. 3A.

The compressed separation plane may be generated at least in part by approximating the separation plane 48 by a first half plane 56 and a second half plane 58 that partition the simulated physical system 40 and intersect at a line (perpendicular to the page in FIG. 3A). "Half plane" is understood to refer to a delimiter of the compressed non-collision region 60. The "half plane" may be a plane, or may alternatively be a vector that defines a cone, as shown in FIG. 3B. The first half plane 56 and the second half plane 58 may together form the compressed separation plane.

In some embodiments, generating the first half plane 56 and the second half plane 58 may include determining a maximum error introduced into the normal vector 50 of the separation plane 48 by the lossy compression. The maximum error may be expressed as a length. In such implementations, the first half plane 56 and second half plane 58 may have a first half plane normal vector 62 and a second half plane normal vector 64 respectively. The first half plane normal vector 62 may be a sum of the normal vector 50 and an error vector with length equal to the maximum error, where the error vector points in a first direction. The second half plane normal vector 64 may be a sum of the normal vector 50 and an error vector with length equal to the maximum error, where the error vector points in a second direction opposite the first direction.

FIG. 3B shows a three-dimensional view of the simulated physical system 40 of FIG. 3A, according to one embodiment. As shown in FIG. 3B, rather than intersecting at a line, the first half plane 56 and the second half plane 58 are vectors that define a conical non-collision region. The conical non-collision region may be formed by rotating the vector defining the first half plane 56 and/or the vector defining the second half plane 58 about the normal vector 50. Thus, the compressed non-collision region 60 may be direction-agnostic regarding displacement of the first body 42 in a direction parallel to the separation plane 48. A cone depicting the maximum error introduced by the lossy compression is also shown in FIG. 3B. For ease of illustration, the concepts discussed herein are primarily discussed by reference to two-dimensional views. It will be appreciated, however, that all such concepts described herein are applicable to three-dimensional physical systems such as that shown in FIG. 3B, even though they may be explained using reference to two-dimensional views.

Figure 4:
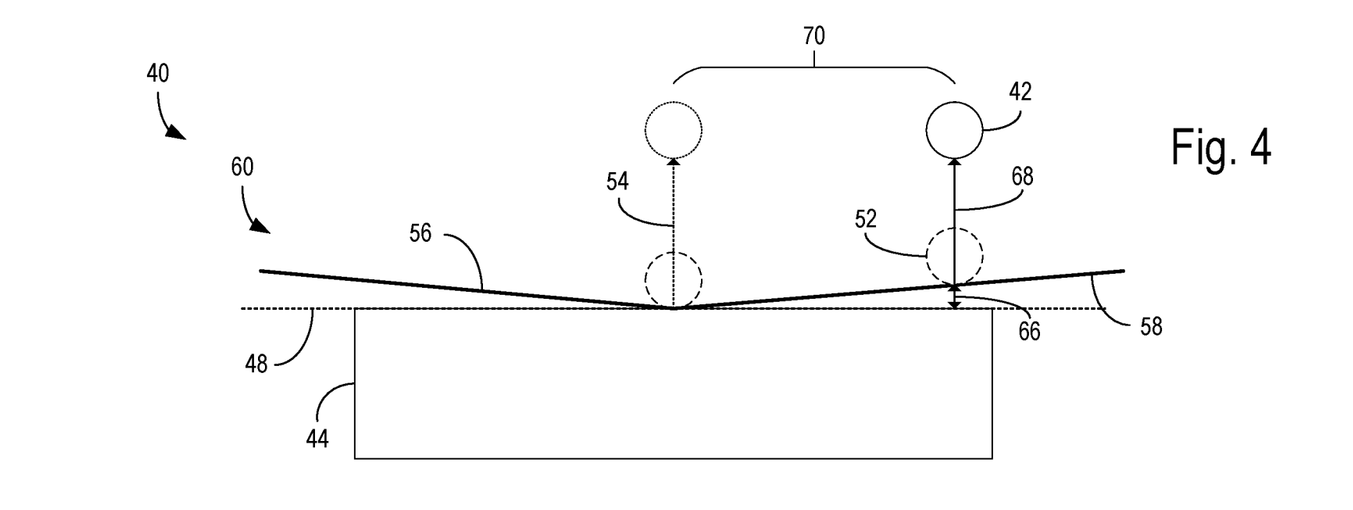
FIG. 4 shows the simulated physical system of FIG. 2, including a compressed separation plane, advancing from a first time step to a second time step.

In some embodiments, as shown in FIG. 4, the physics engine 26 may be further configured to determine a first conservative distance vector 54 between the first body 42 and the compressed separation plane. For example, the first conservative distance vector 54 may be determined in embodiments in which the components of the normal vector 50 are compressed but the displacement from the reference point is not compressed. The first conservative distance vector 54 may be determined at least in part by applying lossy compression to the normal vector 50. Applying lossy compression to the normal vector 50 may include rounding or truncating at least one component of the normal vector 50 expressed as a floating-point number. The at least one component, and typically all coordinates and the length of the normal vector 50, may be compressed from four bytes to one byte, or at another compression ratio.

In FIG. 4, the simulated physical system 40 is shown at a second time step. At the second time step, the physics engine 26 is configured to move the first body 42 from the first position to a second position that has a displacement 70 from the first position. The physics engine 26 is then configured to determine a second conservative distance vector 68 between the first body 42 and the compressed separation plane. As shown in FIG. 4, the second conservative distance vector 68 may have a direction of the first conservative distance vector 54. In addition, the length of the second conservative distance vector 68 may be shorter than the first conservative distance vector 54 in order to account for error that may be introduced by the use of the compressed separation plane in place of the separation plane 48. In the embodiment of FIG. 4, since the compressed separation plane includes a first half plane 56 and a second half plane 58 that are angled with respect to the separation plane 48, the error introduced by the use of the compressed separation plane may depend upon a component of the displacement 70 tangential to the separation plane 48. In some embodiments, the second conservative distance vector 68 is shorter than the first conservative distance vector 54 by an amount 66 equal to the maximum error multiplied by the component of the displacement 70 tangential to the separation plane 48. In addition, when the displacement 70 has a component orthogonal to the separation plane 48, that component may be added to the second conservative distance vector 68. The physics engine 26 may determine whether the first body 42 is within the compressed non-collision region 60 by checking that $$(v_{b1}-v_r)\cdot v_n > \varepsilon l_{td},$$

where $\varepsilon$ is the maximum error and $l_{td}$ is the component of the displacement 70 tangential to the separation plane 48.

Figure 5:
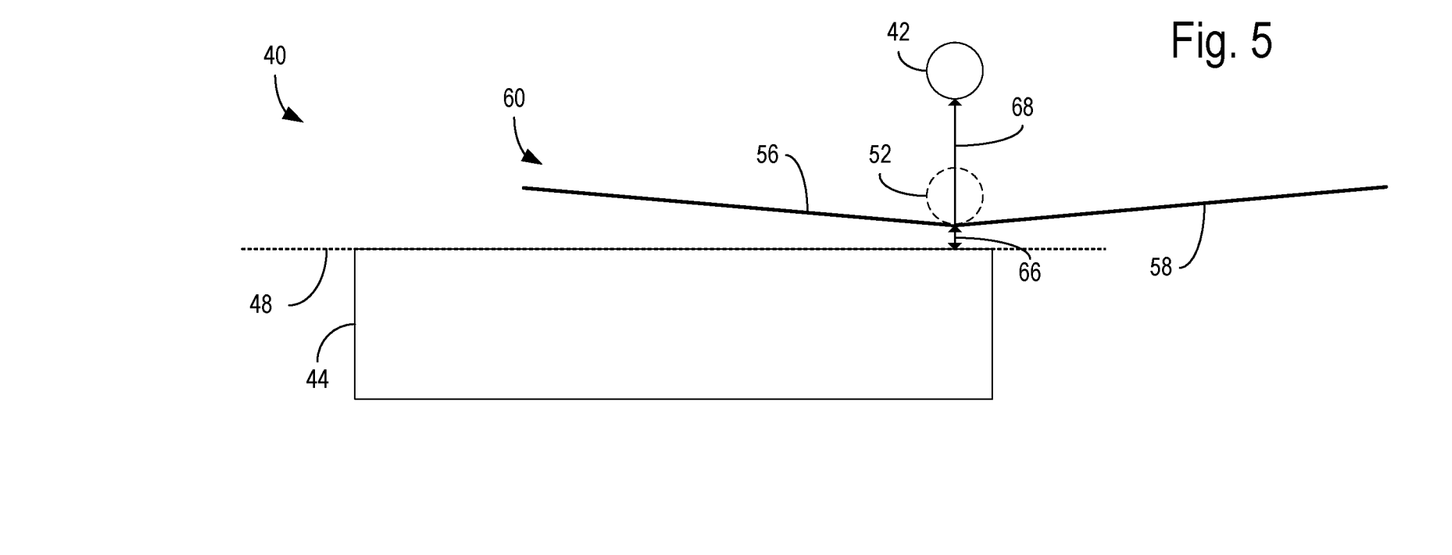
FIG. 5 shows the simulated physical system of FIG. 2, including a compressed separation plane, at a second time step.

At the second time step, the physics engine 26 is further configured to translate the compressed separation plane based on the second position and the second conservative distance vector 68. FIG. 5 shows the simulated physical system 26 of FIGS. 2-4 after the compressed separation plane has been translated. In some implementations, the compressed separation plane may be translated so that the line is spaced away from the first body 42 by a length of the second conservative distance vector 68. In implementations in which the compressed separation plane includes a first half plane 56 and a second half plane 58, the physics engine 26 may translate the first half plane 56 and the second half plane 58 such that the line at which the first half plane 56 and the second half plane 58 intersect intersects with the second conservative distance vector 68 at the tail of the second conservative distance vector 68. In such implementations, the translation of each compressed half plane may have a component normal to the separation plane 48 equal to the amount 66 by which the second conservative distance vector 68 is shorter than the first conservative distance vector 54.

Figure 6:
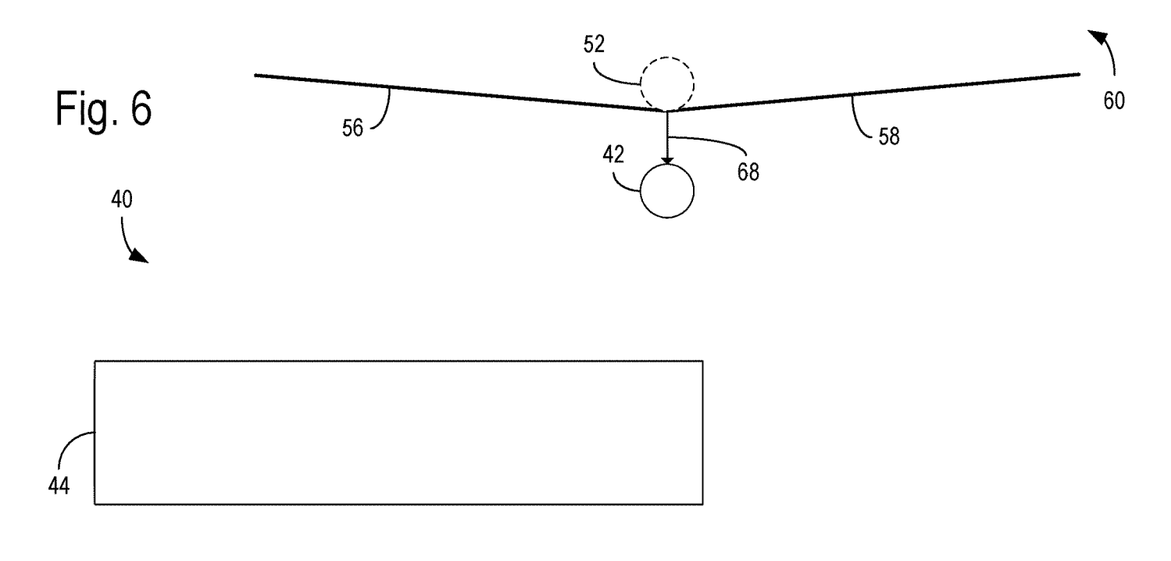
FIG. 6 shows the simulated physical system of FIG. 2 at a second time step, wherein a first body is outside a compressed non-collision region.
Figure 7:
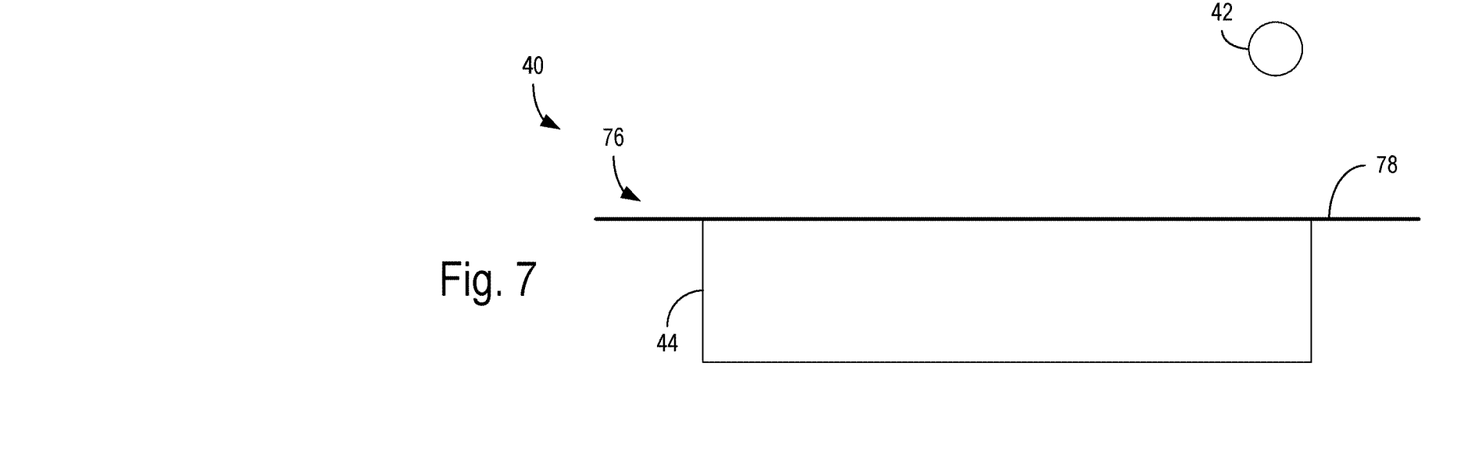
FIG. 7 shows the simulated physical system of FIG. 2, including a second separation plane, at a second time step.

In some implementations, the amount 66 by which the second conservative distance vector 68 is shorter than the first conservative distance vector 54 may be greater than the length of the second conservative distance vector 68. The simulated physical system 40 in such an implementation is shown at the second time step in FIG. 6. The physics engine 26 may determine that the second position of the first body 42 is outside the compressed non-collision region 60 bounded by the compressed separation plane. The physics engine 26 may make this determination when the inequality $$(v_{b1}-v_r)\cdot v_n > \varepsilon l_{td},$$

as disclosed above, does not hold. When the physics engine 26 makes this determination, the physics engine 26 may determine a second non-collision region 76, as shown in FIG. 7. When the first body 42 is within the second non-collision region 76, the first body 42 may not collide with the second body 44, and the second position of the first body 42 may be within the second non-collision region 76. The second non-collision region 76 may be bounded on a side by a second separation plane 78.

Although, in the example embodiments of FIGS. 4-7, the first body 42 moves while the second body 44 remains stationary, embodiments in which the second body 44 moves while the first body 42 remains stationary, where both the first body 42 and the second body 44 move, or where neither body moves are also contemplated. In addition, collision detection may be performed for new pairs of bodies when bodies are added to the region of interest. Data associated with separation planes and/or compressed separation planes may also be deleted when bodies are removed from the region of interest.

Figure 8:
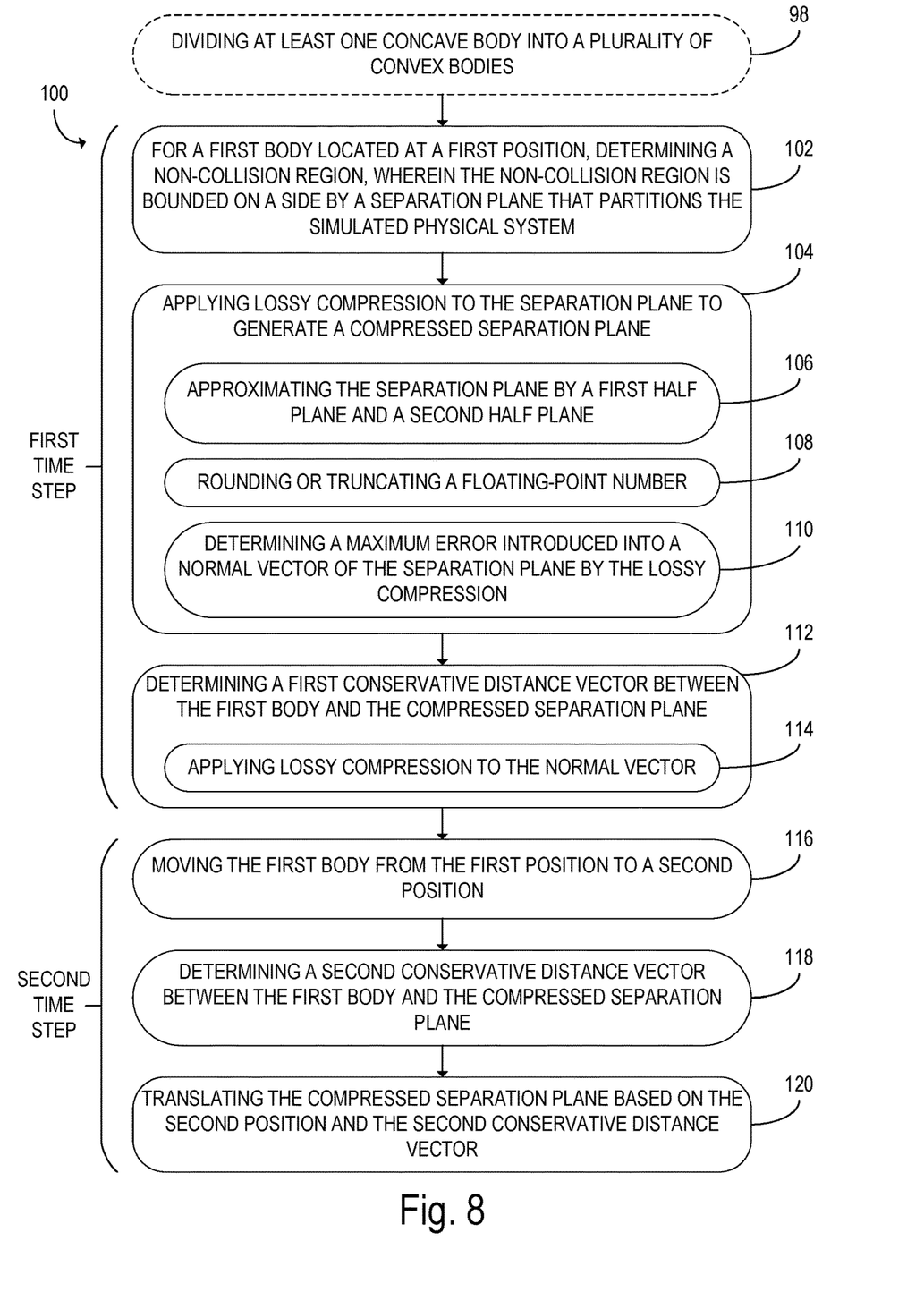
FIG. 8 shows a flowchart of an example method for executing a physics engine, according to one embodiment of the present disclosure.

FIG. 8 shows a flowchart of an example method 100 for executing a physics engine to simulate real-time dynamics of a simulated physical system including a plurality of bodies. The method 100 may be performed on the computing device 10 of FIG. 1. The method 100 includes steps performed at a first time step and steps performed at a second time step.

At step 102, which is performed at the first time step, the method 100 includes, for a first body of the plurality of bodies located at a first position, determining a non-collision region such that when the first body is within the non-collision region, the first body does not collide with a second body of the plurality of bodies. The non-collision region is bounded on a side by a separation plane that partitions the simulated physical system. The separation plane may be represented by a normal vector specified by three components that indicate a direction of the normal vector and a fourth component that indicates a displacement from a reference point.

In order to avoid having the separation plane penetrate the first body and/or the second body, the first body and the second body may be convex. In some embodiments, the method 100 may include dividing at least one concave body into a plurality of convex bodies. Dividing the at least one concave body into a plurality of convex bodies may be performed at step 98 as an entry condition to the method 100.

At the first time step, at step 104, the method 100 further includes applying lossy compression to the separation plane to generate a compressed separation plane. In some embodiments, step 104 may include, at step 106, approximating the separation plane by a first half plane and a second half plane that partition the simulated physical system and intersect at a line. Additionally or alternatively, step 104 may include, at step 108, rounding or truncating at least one floating-point number. The at least one floating-point number may be a component of a normal vector of the separation plane, or a coordinate of a displacement of the separation plane from a reference point. Step 104 may further include compressing at least one coordinate of the separation plane from four bytes to one byte. Additionally or alternatively, step 104 may include, at step 110, determining a maximum error introduced into a normal vector of the separation plane by the lossy compression. In embodiments in which the separation plane is approximated by a first half plane and a second half plane, normal vectors for the first half plane and the second half plane may be determined based at least in part on the maximum error.

At the first time step, at step 112, the method 100 further includes determining a first conservative distance vector between the first body and the compressed separation plane. In some embodiments, the determining the first conservative distance vector may include, at step 114, applying lossy compression to the normal vector. Applying lossy compression to the normal vector may include compressing at least one component of the normal vector from four bytes to one byte.

At the second time step, the method 100 further includes, at step 116, moving the first body from the first position to a second position that has a displacement from the first position. At step 118, the method 100 may further include determining a second conservative distance vector between the first body and the boundary of the compressed separation plane. The second conservative distance vector may have a direction of the first conservative distance vector. Additionally or alternatively, the second conservative distance vector may be shorter than the first conservative distance vector by an amount equal to the maximum error multiplied by a component of the displacement tangential to the separation plane.

At step 120, the method 100 further includes translating the compressed separation plane based on the second position and the second conservative distance vector. In some embodiments, the compressed separation plane may be translated so that the line is spaced away from the first body by a length of the second conservative distance vector. In such embodiments, the line may intersect with the second conservative distance vector at the tail of the second conservative distance vector.

Figure 9:
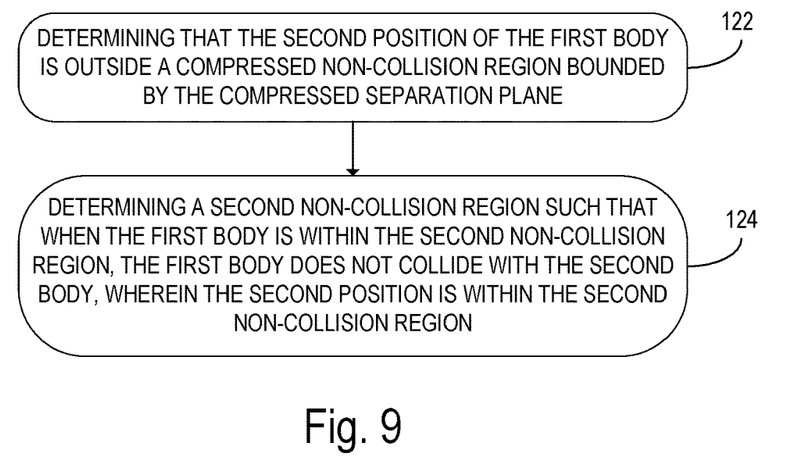
FIG. 9 shows optional steps in the example method of FIG. 8.

FIG. 9 shows two additional steps of the method 100 that may be performed at the second time step in some embodiments. At step 122, the method 100 may further include determining that the second position of the first body is outside a compressed non-collision region bounded by the compressed separation plane. In such embodiments, the method 100 may further include, at step 124, determining a second non-collision region. When the first body is within the second non-collision region, the first body may not collide with the second body, and the second position may be located within the second non-collision region. The second non-collision region may be bounded on a side by a second separation plane.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
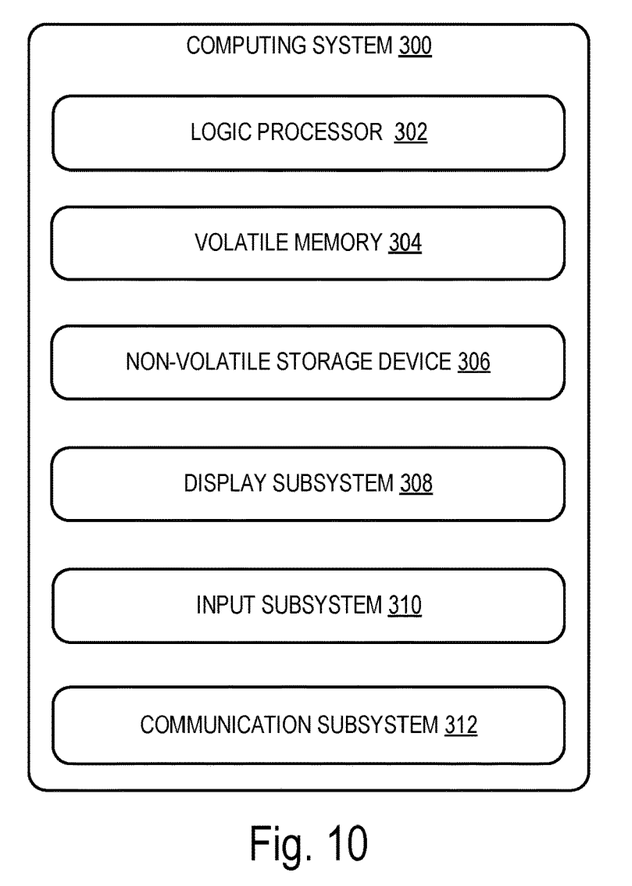
FIG. 10 is a schematic depiction of an example computer device that may be used as the computing device of FIG. 1.

FIG. 10 schematically shows a non-limiting embodiment of a computing system 300 that can enact one or more of the methods and processes described above. Computing system 300 is shown in simplified form. Computing system 300 may embody the computing device 10. Computing system 300 may take the form of one or more personal computers, server computers, tablet computers, network computing devices, mobile computing devices, mobile communication devices (e.g., smart phone), and/or other computing devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 10.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, it will be understood that these virtualized aspects are run on different physical logic processors of various different machines.

Non-volatile storage device 306 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304. One example of volatile memory 304 is random access memory (RAM).

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 that is typically software stored in non-volatile memory and implemented by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, microphone, camera, or game controller. When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 300 to send and/or receive messages to and/or from other devices via a network such as the Internet.

According to a first aspect of the present disclosure, a computing device is provided, comprising a processor configured to execute a physics engine to simulate real-time dynamics of a simulated physical system including a plurality of bodies. The physics engine may be configured to, at a first time step, determine a non-collision region for a first body of the plurality of bodies located at a first position such that when the first body is within the non-collision region, the first body does not collide with a second body of the plurality of bodies. The non-collision region may be bounded on a side by a separation plane that partitions the simulated physical system. The physics engine may be further configured to apply lossy compression to the separation plane to generate a compressed separation plane. The physics engine may be further configured to determine a first conservative distance vector between the first body and the compressed separation plane. At a second time step, the physics engine may be further configured to move the first body from the first position to a second position that has a displacement from the first position. The physics engine may be further configured to determine a second conservative distance vector between the first body and the compressed separation plane. The physics engine may be further configured to translate the compressed separation plane based on the second position and the second conservative distance vector.

According to this aspect, the compressed separation plane may be generated at least in part by approximating the separation plane by a first half plane and a second half plane that partition the simulated physical system and intersect at a line.

According to this aspect, generating the compressed separation plane may include determining a maximum error introduced into a normal vector of the separation plane by the lossy compression.

According to this aspect, the first conservative distance vector may be determined at least in part by applying lossy compression to the normal vector.

According to this aspect, the second conservative distance vector may be shorter than the first conservative distance vector by an amount equal to the maximum error multiplied by a component of the displacement tangential to the separation plane.

According to this aspect, the second conservative distance vector may have a direction of the first conservative distance vector.

According to this aspect, the compressed separation plane may be translated so that the line is spaced away from the first body by a length of the second conservative distance vector.

According to this aspect, the physics engine may be further configured to determine that the second position of the first body is outside a compressed non-collision region bounded by the compressed separation plane. The physics engine may be further configured to determine a second non-collision region such that when the first body is within the second non-collision region, the first body does not collide with the second body, wherein the second position is within the second non-collision region.

According to this aspect, lossy compression may be applied to the separation plane at least in part by rounding or truncating at least one floating-point number.

According to this aspect, lossy compression may be applied to the separation plane at least in part by compressing at least one coordinate of the separation plane from four bytes to one byte.

According to this aspect, the first body and the second body may be convex.

According to another aspect of the present disclosure, a method for executing a physics engine to simulate real-time dynamics of a simulated physical system including a plurality of bodies is provided. The method may comprise, at a first time step, determining a non-collision region for a first body of the plurality of bodies located at a first position such that when the first body is within the non-collision region, the first body does not collide with a second body of the plurality of bodies. The non-collision region may be bounded on a side by a separation plane that partitions the simulated physical system. The method may further comprise applying lossy compression to the separation plane to generate a compressed separation plane. The method may further comprise determining a first conservative distance vector between the first body and the compressed separation plane. At a second time step, the method may further comprise moving the first body from the first position to a second position that has a displacement from the first position. The method may further comprise determining a second conservative distance vector between the first body and the compressed separation plane. The method may further comprise translating the compressed separation plane based on the second position and the second conservative distance vector.

According to this aspect, applying lossy compression to the separation plane to generate the compressed separation plane may include approximating the separation plane by a first half plane and a second half plane that partition the simulated physical system and intersect at a line.

According to this aspect, generating the compressed separation plane may include determining a maximum error introduced into a normal vector of the separation plane by the lossy compression.

According to this aspect, determining the first conservative distance vector may include applying lossy compression to the normal vector.

According to this aspect, the second conservative distance vector may have a direction of the first conservative distance vector.

According to this aspect, the compressed separation plane may be translated so that the line is spaced away from the first body by a length of the second conservative distance vector.

According to this aspect, the method may further comprise determining that the second position of the first body is outside a compressed non-collision region bounded by the compressed separation plane. The method may further comprise determining a second non-collision region such that when the first body is within the second non-collision region, the first body does not collide with the second body, wherein the second position is within the second non-collision region.

According to this aspect, applying lossy compression to the separation plane may include rounding or truncating at least one floating-point number.

According to another aspect of the present disclosure, a computing device is provided, comprising a processor configured to execute a physics engine to simulate real-time dynamics of a simulated physical system including a plurality of bodies. The physics engine may be configured to, at a first time step, determine a non-collision region for a first body of the plurality of bodies located at a first position such that when the first body is within the non-collision region, the first body does not collide with a second body of the plurality of bodies. The non-collision region may be bounded on a side by a separation plane that partitions the simulated physical system. The separation plane may be defined by a normal vector and a displacement from a reference point. The physics engine may be further configured to apply lossy compression to the separation plane to generate a compressed separation plane. The physics engine may be further configured to apply lossy compression to the normal vector of the separation plane to determine a first conservative distance vector between the first body and the compressed separation plane. At a second time step, the physics engine may be further configured to move the first body from the first position to a second position that has a displacement from the first position. The physics engine may be further configured to determine a second conservative distance vector between the first body and the compressed separation plane. The physics engine may be further configured to translate the compressed separation plane based on the second position and the second conservative distance vector.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a memory device; and
   a processor configured to execute a physics engine to simulate real-time dynamics of a simulated physical system including a plurality of bodies, the physics engine being configured to:
   at a first time step in which the physics engine simulates the real-time dynamics of the simulated physical system:
   for a first body of the plurality of bodies located at a first position, determine a non-collision region such that when the first body is within the non-collision region, the first body does not collide with a second body of the plurality of bodies, wherein:
   the non-collision region is bounded on a side by a separation plane that partitions the simulated physical system; and the separation plane is defined, at least in part, by a normal vector between the first body and the second body;

at least in part by rounding or truncating at least one floating-point number that indicates a coordinate of the normal vector, apply lossy compression to the separation plane and its normal vector to generate a compressed separation plane and a compressed normal vector stored in the memory device, the compressed normal vector being defined by less data than the normal vector; and determine a first conservative distance vector for the compressed normal vector between the first body and the compressed separation plane; and at a second time step in which the physics engine simulates the real-time dynamics of the simulated physical system:

move the first body from the first position to a second position that has a displacement from the first position in the simulated physical system;

determine a second conservative distance vector between the first body and the compressed separation plane; and translate the compressed separation plane including its compressed normal vector stored in the memory device based on the second position and the second conservative distance vector.

2. The computing device of claim 1, wherein the compressed normal vector of the compressed separation plane is generated at least in part by approximating the separation plane by a first half plane and a second half plane that partition the simulated physical system and intersect at a line.

3. The computing device of claim 2, wherein generating the compressed normal vector of the compressed separation plane includes determining a maximum error introduced into the normal vector of the separation plane by the lossy compression.

4. The computing device of claim 3, wherein the first conservative distance vector is determined at least in part by applying lossy compression to the normal vector.

5. The computing device of claim 4, wherein the second conservative distance vector is shorter than the first conservative distance vector by an amount equal to the maximum error multiplied by a component of the displacement tangential to the separation plane.

6. The computing device of claim 4, wherein the second conservative distance vector has a direction of the first conservative distance vector.

7. The computing device of claim 6, wherein the compressed separation plane is translated so that the line is spaced away from the first body by a length of the second conservative distance vector.

8. The computing device of claim 1, wherein the physics engine is further configured to:

determine that the second position of the first body is outside a compressed non-collision region bounded by the compressed separation plane; and determine a second non-collision region such that when the first body is within the second non-collision region, the first body does not collide with the second body, wherein the second position is within the second non-collision region.

9. The computing device of claim 1, wherein the first body and the second body are convex.

10. A method for executing a physics engine to simulate real-time dynamics of a simulated physical system including a plurality of bodies, the method comprising:

at a first time step in which the physics engine simulates the real-time dynamics of the simulated physical system:

for a first body of the plurality of bodies located at a first position, determining a non-collision region such that when the first body is within the non-collision region, the first body does not collide with a second body of the plurality of bodies, wherein:

the non-collision region is bounded on a side by a separation plane that partitions the simulated physical system; and the separation plane is defined, at least in part, by a normal vector between the first body and the second body;

at least in part by rounding or truncating at least one floating-point number that indicates a coordinate of the normal vector, applying lossy compression to the separation plane and its normal vector to generate a compressed separation plane and a compressed normal vector stored in a memory device, the compressed normal vector being defined by less data than the normal vector; and determining a first conservative distance vector for the compressed normal vector between the first body and the compressed separation plane; and at a second time step in which the physics engine simulates the real-time dynamics of the simulated physical system:

moving the first body from the first position to a second position that has a displacement from the first position in the simulated physical system;

determining a second conservative distance vector between the first body and the compressed separation plane; and translating the compressed separation plane including its compressed normal vector stored in the memory device based on the second position and the second conservative distance vector.

11. The method of claim 10, wherein applying lossy compression to the normal vector of the separation plane to generate the compressed normal vector of the compressed separation plane includes approximating the separation plane by a first half plane and a second half plane that partition the simulated physical system and intersect at a line.

12. The method of claim 11, wherein generating the compressed normal vector of the compressed separation plane includes determining a maximum error introduced into the normal vector of the separation plane by the lossy compression.

13. The method of claim 12, wherein determining the first conservative distance vector includes applying lossy compression to the normal vector.

14. The method of claim 13, wherein the second conservative distance vector has a direction of the first conservative distance vector.

15. The method of claim 14, wherein the compressed separation plane is translated so that the line is spaced away from the first body by a length of the second conservative distance vector.

16. The method of claim 10, further comprising:

determining that the second position of the first body is outside a compressed non-collision region bounded by the compressed separation plane; and determining a second non-collision region such that when the first body is within the second non-collision region, the first body does not collide with the second body, wherein the second position is within the second non-collision region.

17. A computing device, comprising:

a memory device; and a processor configured to execute a physics engine to simulate real-time dynamics of a simulated physical system including a plurality of bodies, the physics engine being configured to:

at a first time step in which the physics engine simulates the real-time dynamics of the simulated physical system:

for a first body of the plurality of bodies located at a first position, determine a non-collision region such that when the first body is within the non-collision region, the first body does not collide with a second body of the plurality of bodies, wherein:

the non-collision region is bounded on a side by a separation plane that partitions the simulated physical system; and         the separation plane is defined, at least in part, by a normal vector between the first body and the second body and a displacement from a reference point; and     at least in part by rounding or truncating at least one floating-point number that indicates a coordinate of the normal vector, apply lossy compression to the separation plane and its normal vector to generate a compressed separation plane and a compressed normal vector stored in the memory device, the compressed normal vector being defined by less data than the normal vector; and     determine a first conservative distance vector for the compressed normal vector between the first body and the compressed separation plane; and at a second time step in which the physics engine simulates the real-time dynamics of the simulated physical system:

move the first body from the first position to a second position that has a displacement from the first position in the simulated physical system;

determine a second conservative distance vector between the first body and the compressed separation plane; and     translate the compressed separation plane including its compressed normal vector stored in the memory device based on the second position and the second conservative distance vector.

18. The computing device of claim 1, wherein the compressed separation plane is conical in shape.

* * * * *